(12) United States Patent
Abe et al.

(10) Patent No.: US 10,195,789 B2
(45) Date of Patent: Feb. 5, 2019

(54) COMPOSITE STRUCTURE AND METHOD FOR MOLDING COMPOSITE STRUCTURE

(71) Applicant: MITSUBISHI HEAVY INDUSTRIES, LTD., Tokyo (JP)

(72) Inventors: Toshio Abe, Tokyo (JP); Kiyoka Takagi, Tokyo (JP); Takayuki Koyama, Tokyo (JP); Kazuaki Kishimoto, Tokyo (JP); Koichi Saito, Aichi (JP); Takashi Ishida, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/531,871

(22) PCT Filed: Oct. 7, 2015

(86) PCT No.: PCT/JP2015/078521
§ 371 (c)(1),
(2) Date: May 31, 2017

(87) PCT Pub. No.: WO2016/098426
PCT Pub. Date: Jun. 23, 2016

(65) Prior Publication Data
US 2017/0266874 A1    Sep. 21, 2017

(30) Foreign Application Priority Data
Dec. 15, 2014 (JP) .................. 2014-253460

(51) Int. Cl.
*B29C 65/50* (2006.01)
*B29C 65/48* (2006.01)
(Continued)

(52) U.S. Cl.
CPC ........ *B29C 65/486* (2013.01); *B29C 65/4835* (2013.01); *B29C 65/5057* (2013.01);
(Continued)

(58) Field of Classification Search
CPC ........ B29C 65/5057; B64C 2001/0072; B32B 2405/00
(Continued)

(56) References Cited

U.S. PATENT DOCUMENTS

| 4,941,937 A | 7/1990 | Iseler et al. |
| 2004/0151878 A1* | 8/2004 | Mead ................ B32B 7/12 428/156 |

(Continued)

FOREIGN PATENT DOCUMENTS

| JP | 2-63724 | 3/1990 |
| JP | 2003-39566 | 2/2003 |

(Continued)

OTHER PUBLICATIONS

International Search Report dated Dec. 15, 2015 in corresponding International Application No. PCT/JP2015/078521.

(Continued)

*Primary Examiner* — Matthew J Daniels
*Assistant Examiner* — Hana C Page
(74) *Attorney, Agent, or Firm* — Wenderoth, Lind & Ponack, L.L.P.

(57) ABSTRACT

This structure is provided with a first composite material 11, a second composite material 12 joined to the first composite material 11 by a film adhesive 21 provided between the first composite material 11 and the second composite material 12, and a corner fillet part 13 provided on a corner part 15 formed by the first composite material 11 and the second composite material 12. The shape of the corner fillet part 13 is a design shape P designed in advance, and the corner fillet part 13 is formed by curing the film adhesive 21 after arranging the film adhesive 21 on the corner part 15 so as to fit into the design shape P.

5 Claims, 6 Drawing Sheets

(51) Int. Cl.

| | | |
|---|---|---|
| *B64C 1/00* | (2006.01) | |
| *B64C 1/12* | (2006.01) | |
| *B29C 70/44* | (2006.01) | |
| *B32B 3/28* | (2006.01) | |
| *B32B 5/12* | (2006.01) | |
| *B32B 7/04* | (2006.01) | |
| *B32B 27/08* | (2006.01) | |
| *B32B 27/38* | (2006.01) | |
| *B64C 1/06* | (2006.01) | |
| *B29C 65/00* | (2006.01) | |
| *B29D 99/00* | (2010.01) | |
| *B29L 31/30* | (2006.01) | |
| *B29L 24/00* | (2006.01) | |

(52) U.S. Cl.
CPC .... *B29C 65/5071* (2013.01); *B29C 66/00145* (2013.01); *B29C 66/112* (2013.01); *B29C 66/1122* (2013.01); *B29C 66/131* (2013.01); *B29C 66/326* (2013.01); *B29C 66/54* (2013.01); *B29C 66/634* (2013.01); *B29C 66/7212* (2013.01); *B29C 66/81455* (2013.01); *B29C 70/44* (2013.01); *B29D 99/0014* (2013.01); *B29D 99/0017* (2013.01); *B32B 3/28* (2013.01); *B32B 5/12* (2013.01); *B32B 7/045* (2013.01); *B32B 27/08* (2013.01); *B32B 27/38* (2013.01); *B64C 1/00* (2013.01); *B64C 1/061* (2013.01); *B64C 1/12* (2013.01); *B29C 66/5346* (2013.01); *B29C 66/53462* (2013.01); *B29L 2024/003* (2013.01); *B29L 2031/3076* (2013.01); *B29L 2031/3082* (2013.01); *B29L 2031/3085* (2013.01); *B32B 2262/106* (2013.01); *B32B 2605/18* (2013.01); *B64C 2001/0072* (2013.01); *Y02T 50/43* (2013.01)

(58) Field of Classification Search
USPC ....................................................... 156/242
See application file for complete search history.

(56) References Cited

U.S. PATENT DOCUMENTS

| | | |
|---|---|---|
| 2008/0290214 A1 | 11/2008 | Guzman et al. |
| 2011/0088833 A1 | 4/2011 | Guzman et al. |
| 2012/0148789 A1* | 6/2012 | Hallander ........... B29C 65/5057 428/113 |
| 2013/0344291 A1 | 12/2013 | Pearson et al. |
| 2014/0299257 A1* | 10/2014 | Pearson ................ B29C 70/865 156/245 |

FOREIGN PATENT DOCUMENTS

| | | |
|---|---|---|
| JP | 2010-527836 | 8/2010 |
| JP | 2014-12403 | 1/2014 |

OTHER PUBLICATIONS

Written Opinion of the International Searching Authority dated Dec. 15, 2015 in corresponding International Application No. PCT/JP2015/078521 (with English translation).

* cited by examiner

COMPOSITE STRUCTURE AND METHOD FOR MOLDING COMPOSITE STRUCTURE

TECHNICAL FIELD

The present invention relates to a composite structure having a corner part, and a method for molding the composite structure.

BACKGROUND ART

In the related art, a hat type reinforcing member made of a composite material is known as a composite structure having a corner part (for example, refer to PTL 1). The hat type reinforcing member made of a composite material includes a hat section made of a composite material, a plurality of reinforcing plies made of a composite material joined to the hat section made of a composite material, and a noodle-like corner filler. The noodle-like corner filler is arranged in a substantially triangular noodle-like corner filler region formed by the plurality of reinforcing plies made of a composite material.

CITATION LIST

Patent Literature

[PTL 1] Japanese Unexamined Patent Application Publication No. 2014-12403

SUMMARY OF INVENTION

Technical Problem

Here, the noodle-like corner filler is generally formed by bundling prepreg in which resin is impregnated in carbon fibers. Here, the prepreg is formed by continuously aligning the carbon fibers in one direction. In a case where the prepreg is bundled, the carbon fibers are included in the prepreg. Therefore, the noodle-like corner filler is hard and is not easily molded. For this reason, in PTL 1, in a case where the noodle-like corner filler is molded so as to fit into the noodle-like corner filler region, the corner filler is molded using a jig or mold. However, in a case where the jig or mold is used, since cost is raised due to the jig or mold, it becomes difficult to reduce the costs for molding the corner filler.

Additionally, in PTL 1, the hat type reinforcing member made of a composite material including the corner filler is molded (preform), and thereafter, the hat type reinforcing member made of a composite material that is pre-formed is cured. For this reason, in a case where a shock is given to the hat type reinforcing member made of a composite material when handling the hat type reinforcing member made of a composite material after the pre-forming (after curing), damage may occur at a corner filler and the periphery of the corner filler.

Thus, an object of the invention is to provide a composite structure that is easy to handle and can mold a corner fillet part inexpensively, and a method for molding a composite structure.

Solution to Problem

A composite structure of the invention includes a first composite material; a second composite material joined to the first composite material with a film adhesive provided between the first composite material and the second composite material; and a corner fillet part provided on a corner part formed by the first composite material and the second composite material. The shape of the corner fillet part is a design shape designed in advance, and the corner fillet part is formed by curing the film adhesive after arranging the film adhesive on the corner part so as to fit into the design shape.

According to this configuration, the corner fillet part can be formed in the design shape by arranging the film adhesive on the corner part and curing the film adhesive. In this case, since the film adhesive has only to be arranged on the corner part, it is possible to form the corner fillet part inexpensively, without using a jig or mold. Additionally, since the corner fillet part can be formed simultaneously with the joining between the first composite material and the second composite material by the film adhesive, it is possible to easily handle the composite structure after becoming curing in which the first composite material, the second composite material, and the corner fillet part are integrated. In addition, the film adhesive includes resin, for example, is configured using epoxy-based resin.

Additionally, it is preferable that the film adhesive is continuous toward the corner part from between the first composite material and the second composite material, and the corner fillet part is formed with a surplus part of the film adhesive exposed from between the first composite material and the second composite material.

According to this configuration, the corner fillet part can be formed with the surplus part of the film adhesive used for the joining between the first composite material and the second composite material.

Additionally, it is preferable that the film adhesive includes a first film adhesive arranged between the first composite material, and the second composite material, and a second film adhesive provided separately from the first film adhesive to form the corner fillet part.

According to this configuration, the first film adhesive used for the joining between the first composite material and the second composite material, and the second film adhesive that forms the corner fillet part can be provided separately. For this reason, the shape, type, or the like of the second film adhesive to be arranged on the corner part can be changed appropriately. For example, it is possible to change the rigidity of the corner fillet part by changing the shape, type, or the like of the second film adhesive according to the corner part.

Additionally, it is preferable that a bagging film is arranged on the corner part during the curing of the film adhesive, the bagging film is arranged such that the shape of the corner fillet part becomes the design shape, and the corner fillet part is formed in the design shape by curing the film adhesive after the shape of the bagging film.

According to this configuration, the shape of the corner fillet part can be formed in the design shape by the bagging film. For this reason, the corner fillet part with a large curvature can be formed, for example, by arranging the bagging film having a large diameter with respect to the corner part. On the other hand, the corner fillet part with a small curvature can be formed, for example, by arranging the bagging film having a small diameter with respect to the corner part.

Additionally, it is preferable that the size of the film adhesive that forms the corner fillet part is adjusted such that a filling rate of the film adhesive with respect to the design shape is between 50% to 200%.

According to this configuration, the film adhesive can be suitably filled with respect to the design shape of the corner fillet part. That is, during the curing of the film adhesive, the film adhesive is softened, and then, the softened film adhesive flows along the corner part. Specifically, the softened film adhesive flows out of the corner part or flows into another corner part. For this reason, by setting the filling rate of the film adhesive on the corner part to the above range, the film adhesive can be filled according to the flow of the film adhesive, and thereby, the corner fillet part formed after the curing can be formed in the design shape.

Additionally, it is preferable that the film adhesive arranged on the corner part is formed in a lump by being wound spirally.

According to this configuration, since the film adhesive is not easily spread by winding the film adhesive spirally, the shape of the film adhesive formed in a lump can be maintained easily.

Additionally, it is preferable that the film adhesive arranged on the corner part is formed in a lump by being bent in the shape of bellows.

According to this configuration, the film adhesive can be simply formed in a lump by bending the film adhesive in the shape of bellows.

Additionally, it is preferable that the film adhesive arranged on the corner part is formed in a lump by being folded.

According to this configuration, the film adhesive can be simply formed in a lump by folding the film adhesive.

A method for molding the composite structure of the invention includes a film formation step of forming a film adhesive, which is used in order to join a first composite material and a second composite material together, in a lump; an arrangement step of arranging the film adhesive formed in a lump on a corner part formed by the first composite material and the second composite material, and a curing step of curing the film adhesive to form a corner fillet part on the corner part.

According to this configuration, the corner fillet part can be formed by deforming the film adhesive in a lump, arranging the lumped film adhesive on the corner part, and curing the film adhesive. In this case, since the film adhesive can be easily formed in a lump, it is possible to form the corner fillet part inexpensively, without using a jig or mold. Additionally, since the corner fillet part can be formed simultaneously with the joining between the first composite material and the second composite material by the film adhesive, it is not necessary to preform the corner fillet part. For this reason, since it is not necessary to handle the preformed corner fillet part, occurrence of damage of the corner fillet part and the periphery of the corner fillet part can be suppressed.

DESCRIPTION OF EMBODIMENTS

Hereinafter, embodiments related to the invention will be described in detail with reference to the drawings. In addition, the invention is not limited by these embodiments. Additionally, constituent elements in the following embodiments include elements capable of being easily substituted by a person skilled in the art, or substantially the same elements. Moreover, constituent elements described hereinbelow can be appropriately combined, and in a case where there are a plurality of embodiments, it is also possible to combine the respective embodiments Embodiment 1

Figure 1:
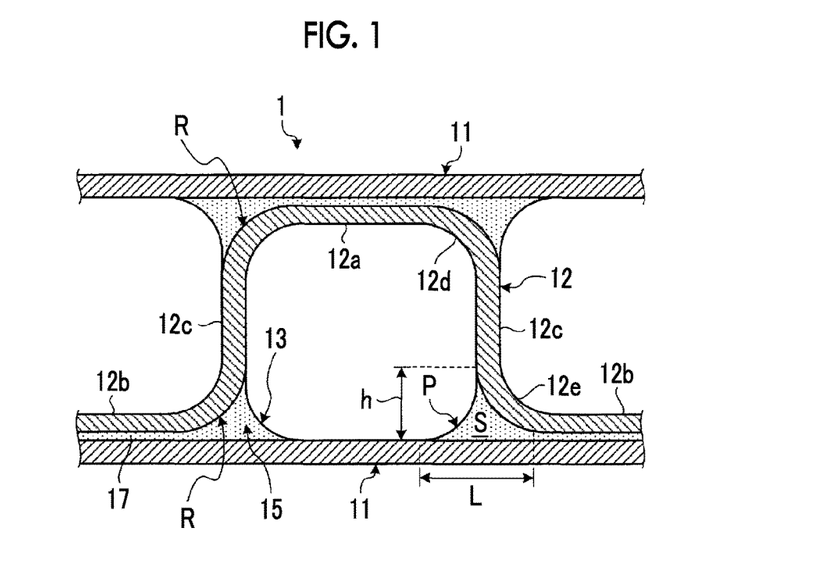
FIG. 1 is a sectional view of a composite structure after curing related to Embodiment 1.
Figure 2:
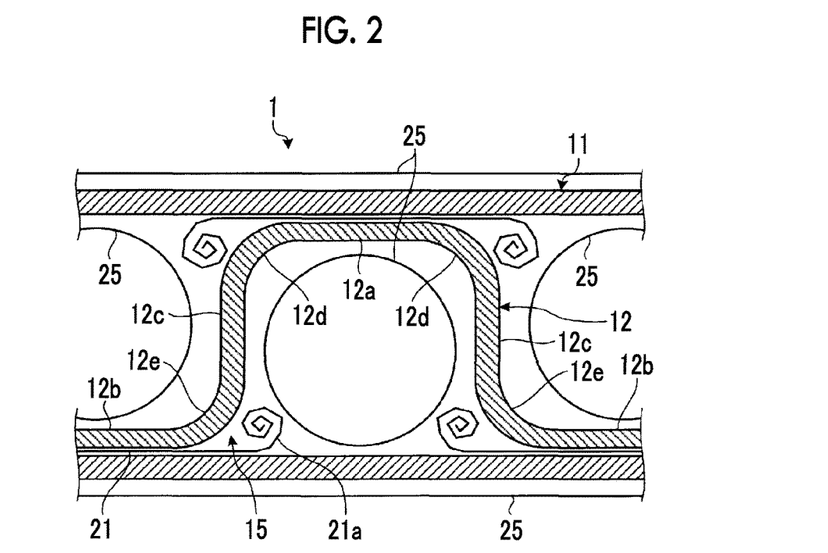
FIG. 2 is a sectional view of the composite structure before curing related to Embodiment 1.
Figure 3:
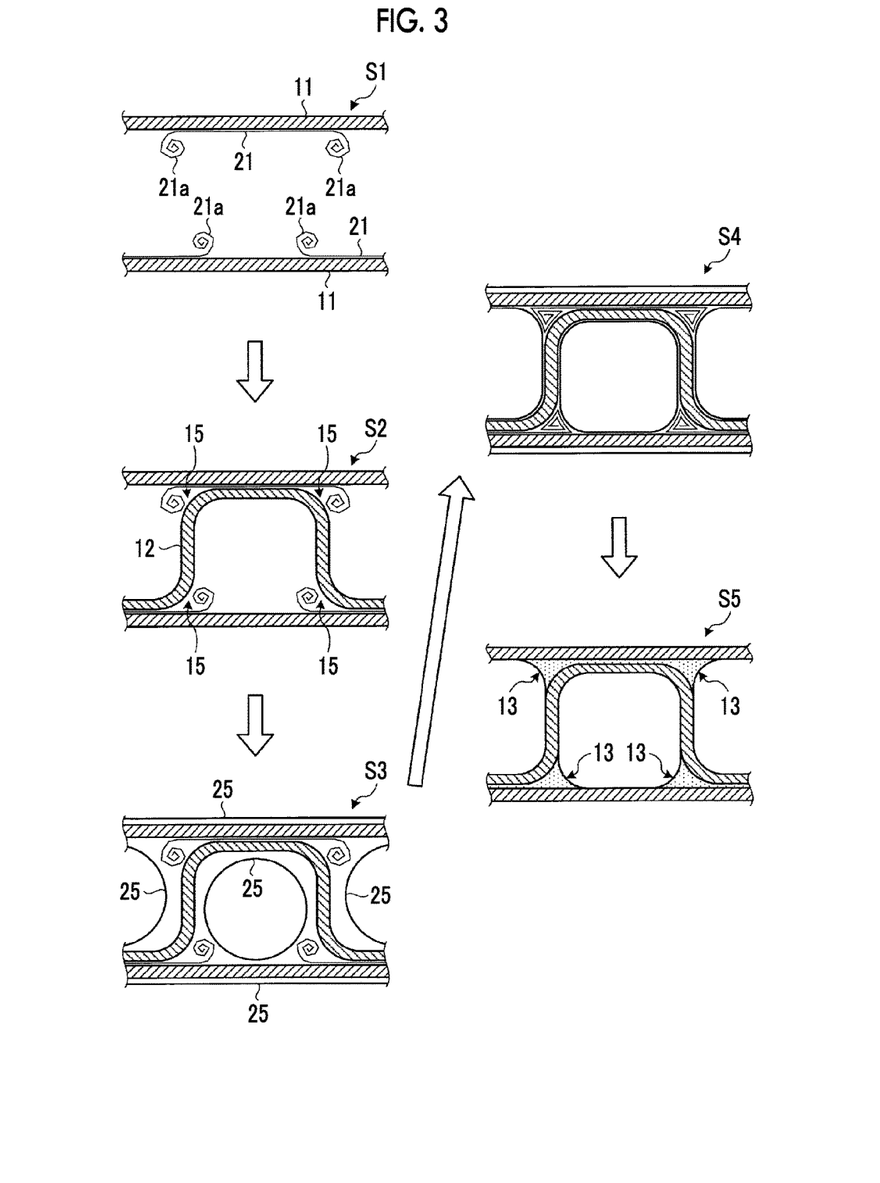
FIG. 3 is an explanatory view regarding a method for molding the composite structure related to Embodiment 1.

FIG. 1 is a sectional view of a composite structure after curing related to Embodiment 1. FIG. 2 is a sectional view of the composite structure before curing related to Embodiment 1. FIG. 3 is an explanatory view regarding a method for molding the composite structure related to Embodiment 1.

The composite structure 1 illustrated in FIG. 1 is a structure after curing that is available as a product. The composite structure 1 is, for example, a structure that constitutes an airframe of an aircraft and is applied to a main wing, a tail, or a fuselage. The composite structure 1 after curing illustrated in FIG. 1 includes a first composite material 11, a second composite material 12, and a corner fillet part 13.

The first composite material 11 and the second composite materials 12 are configured using carbon fiber reinforced plastic (CFRP). In addition, in Embodiment 1, the first composite material 11 and the second composite material 12 are configured using CFRP. However, the first and second composite materials are not limited particularly as long as composite materials using resin and fiber are provided. The first composite material 11 is formed in a flat plate shape, and a pair of the first composite materials is provided such that plate surfaces thereof face each other. The first composite materials 11 are applied to, for example, a skin (outer plate) provided in an aircraft.

The second composite material 12 is provided between the pair of first composite materials 11. The second composite material 12 is applied to, for example, a stringer (longitudinal material) provided in an aircraft. The second composite material 12 has an abutment part 12*a* that abuts against one first composite material 11, an abutment part 12*b* that abuts against the other first composite material 11, a longitudinal part 12*c* provided over between the pair of first composite materials 11, a bent part 12*d* between the abutment part 12*a* and the longitudinal part 12*c*, and a bent part 12*e* between the abutment part 12*b* and the longitudinal part 12*c*. The second composite material 12 is formed to extend in a depth direction with a forward-backward direction of FIG. 1 being the depth direction.

The abutment part 12*a* is provided along the plate surface of the one first composite material 11. The abutment part 12*b* is provided along the plate surface of the other first composite material 11. Here, a direction in which the pair of first composite materials 11 face each other is a thickness direction (an upward-downward direction of FIG. 1), and a direction orthogonal to the depth direction and the thickness direction is a width direction (a leftward-rightward direction of FIG. 1). In this case, the abutment part 12a and the abutment part 12b are alternately arranged in the width direction. The longitudinal part 12c is arranged to extend in the thickness direction. The bent part 12d couples the abutment part 12a and the longitudinal part 12c together, and is formed so as to have a predetermined curvature radius in a section orthogonal to the depth direction. The bent part 12e couples the abutment part 12b and the longitudinal part 12c together, and is formed so as to have a predetermined curvature radius in the section orthogonal to the depth direction. The second composite material 12 is formed in a hat shape by the abutment part 12a, the abutment part 12b, longitudinal part 12c, the bent part 12d, and the bent part 12e being connected and integrally formed.

An adhesive layer 17 is provided between each first composite material 11 and the second composite material 12. The adhesive layer 17 joins the abutment parts 12a and 12b of each first composite material 11 and the second composite material 12 together. The adhesive layer 17 is formed by heat-curing a film adhesive 21 to be described below.

The first composite material 11 and the second composite material 12 that are joined together via the adhesive layer 17 form a corner part 15 on diametral outer sides of the bent parts 12d and 12e. The corner part 15 is formed to extend in the depth direction. The corner fillet part 13 is provided in the corner part 15 in order to improve the peeling intensity of the first composite material 11 and the second composite material 12. In addition, the first composite material 11 and the second composite material 12 may have any shapes without being limited to shapes illustrated in FIG. 1 as long as these materials have shapes that form the corner part 15. Additionally, the corner part 15 may have any shapes without being limited to the shape illustrated in FIG. 1.

The corner fillet part 13 is provided in the corner part 15 between the first composite material 11 and the second composite material 12. The corner fillet part 13 relaxes the peeling stress between the first composite material 11 and the second composite material 12 in the corner part 15. The corner fillet part 13 is formed by heat-curing the film adhesive 21 to be described below. The corner fillet part 13 is filled with the film adhesive 21 at a predetermined filling rate according to a design shape P designed in advance so as to have the design shape P. Here, a predetermined curvature radius R is given on the diametral outer sides of the bent parts 12d and 12e, and the corner fillet part 13 is formed after the bent parts 12d and 12e.

Specifically, as for the design shape P of the corner fillet part 13, in the section orthogonal to the depth direction, a surface touching the second composite material 12 (bent parts 12d and 12e) has the predetermined curvature radius R, and a surface (a surface touching a bagging film 25 to be described below) touching the outside also having the predetermined curvature radius R. That is, the cross-sectional area S of the design shape P of the corner fillet part 13 in Embodiment 1 is expressed by "S=L×h−πR2/2". In addition, L is the length of a base of the corner fillet part 13 touching the first composite material 11, and h is the length (height) from the first composite material 11 in the thickness direction. In addition, the design shape P of the corner fillet part 13 may have any shapes without being limited to the above shape as long as shapes capable of relaxing the peeling stress in the corner part 15 are provided.

In this case, since the corner fillet part 13 and the adhesive layer 17 are formed using the same film adhesive 21, the corner filler part and the adhesive layer are formed of the same material. In other words, in the composite structure 1 before curing, the film adhesive 21 provided between the first composite material 11 and the second composite material 12 forms the corner fillet part 13 by being heat-cured. Next, the composite structure 1 before curing will be described with reference to FIG. 2.

As illustrated in FIG. 2, the composite structure 1 before curing includes the first composite materials 11, the second composite material 12, and the film adhesive 21. Additionally, in the composite structure 1 before curing, the bagging film 25 that gives a shape such that the shape of the corner fillet part 13 becomes the design shape P is installed. In addition, since the shape of the first composite materials 11 and the second composite material 12 are the same as those of FIG. 1, the description thereof will be omitted. Additionally, although the first composite materials 11 and the second composite material 12 after curing are made of cured CFRP, the first composite materials 11 and the second composite materials 12 before curing are made of prepreg that is CFRP before curing.

The film adhesive 21 configured using a thermosetting resin material, for example, is a film-like adhesive, having a film thickness of about 0.1 mm to 0.2 mm, using epoxy-based resin. The film adhesive 21 is a single film that covers the plate surface of each first composite material 11. The film adhesive 21 is continuously provided toward the corner part 15 from between each first composite material 11 and the second composite material 12. Specifically, the film adhesive 21 is provided over between the abutment parts 12a and 12b of each first composite material 11 and the second composite material 12, and is provided to be exposed to the corner part 15 from between the first composite material 11 and the second composite material 12. That is, the film adhesive 21 to be exposed to the corner part 15 is a surplus part 21a.

The surplus part 21a of the film adhesive 21 is formed in a lump by being spirally wound toward between the first composite material 11 and the second composite material 12. Then, the lumped surplus part 21a of the film adhesive 21 is arranged on the corner part 15. The surplus part 21a of the film adhesive 21 arranged on the corner part 15 is adjusted in size such that the filling rate thereof with respect to the design shape P of the corner fillet part 13 reaches 50% to 200%.

Then, the film adhesive 21 is softened by heat-curing being performed, the softened film adhesive 21 is cured, and the corner fillet part 13 and the adhesive layer 17 are formed. In addition, the heat-curing is, for example, autoclaving, and the details thereof will be described in detail.

The bagging film 25 is a film that houses the composite structure 1 before curing therein to cover the composite structure 1, in order to mold the composite structure 1 in a predetermined shape during the heat-curing of the composite structure 1 including the film adhesive 21. During the heat-curing of the film adhesive 21 by means of vacuuming or the like, the bagging film 25 is configured such that the inside thereof has low pressure as compared to the outside, and is brought into close contact with the composite structure 1 before curing. Additionally, the outside of the bagging film 25 is brought into a high-temperature high-pressure state during the heat-curing of the film adhesive 21. For this reason, the bagging film 25 comes into contacts the film adhesive 21 arranged on the corner part 15, and the film adhesive 21 is softened in this state. Then, the softened film adhesive 21 has a shape that resembles the bagging film 25, and as the film adhesive 21 is cured, the corner fillet part 13 is formed in the design shape P.

Here, the design shape P of the corner fillet part 13 becomes changeable by adjusting the shape of the bagging film 25. For example, a case where the curvature radius R in a surface touching the outside of the corner fillet part 13 is changed will be described. The bagging film 25 is arranged in a space surrounded by the first composite materials 11 and the second composite material 12. In this case, the bagging film 25 has a loop shape of which the section is closed. In a case where the curvature radius R of the corner fillet part 13 is made small, the bagging film 25 having a small diameter with respect to the corner part 15 by lengthening the loop length of the bagging film 25 is arranged. On the other hand, in a case where the curvature radius R of the corner fillet part 13 is made large, the bagging film 25 having a large diameter with respect to the corner part 15 by shortening the loop length of the bagging film 25 is arranged.

Next, a method for molding the above composite structure 1 will be described with reference to FIG. 3. First, the film adhesive 21 is arranged with respect to each of the pair of first composite materials 11. Then, the surplus part 21a of the arranged film adhesive 21 is spirally wound and is formed in a lump (Step S1: film formation step). Subsequently, the second composite material 12 is installed between the pair of first composite materials 11. Accordingly, the lumped film adhesive 21 is arranged on the corner part 15 formed by each first composite material 11 and the second composite material 12 (Step S2: arrangement step). Accordingly, the composite structure 1 before curing illustrated in FIG. 2 is formed.

Next, the composite structure 1 is housed inside the bagging film 25 by covering the composite structure 1 with the bagging film 25 (Step S3). The composite structure 1 housed inside the bagging film 25 is subjected to heat-curing by an autoclave device. That is, the composite structure 1 housed inside the bagging film 25 is housed within a container of the autoclave device. Then, the inside of the container is brought into high-temperature high-pressure state, and the bagging film 25 is brought into close contact with the composite structure 1 by the inside of the bagging film 25 being vacuumed (Step S4: curing step). Then, the adhesive layer 17 is formed by the composite structure 1 before curing being cured after the film adhesive 21 is softened. Accordingly, in the composite structure 1 after curing, the first composite material 11 and the second composite material 12 are joined together by the adhesive layer 17. Additionally, the corner fillet part 13 is formed by the composite structure 1 before curing being cured after the surplus part 21a of the film adhesive 21 is softened (Step S5). In this way, the corner fillet part 13 can be formed simultaneously with the curing of the composite structure 1, that is, simultaneously with the joining between the first composite material 11 and the second composite material 12.

Here, if heat-curing is performed in Step S4, the softened resin flows within the bagging film 25 by the resin included in the first composite material 11 and the second composite material 12 and the film adhesive (resin) 21 being softened. In this case, the filling rate of the surplus part 21a of the film adhesive 21 with respect to the design shape P is between 50% to 200%, and is a filling rate according to flow of the film adhesive 21. Thus, even in a case where the resin flows into or flows out of the corner part 15, the corner fillet part 13 can be formed in the design shape P.

As described above, according to Embodiment 1, the corner fillet part 13 can be formed by deforming the surplus part 21a of the film adhesive 21 in a lump, arranging the lumped surplus part 21a of the film adhesive 21 on the corner part 15, and heat-curing the film adhesive 21. In this case, since the film adhesive 21 can be easily formed in a lump, it is possible to form the corner fillet part 13 inexpensively, without using a jig or mold. Additionally, since the corner fillet part 13 can be formed simultaneously with the joining between the first composite material 11 and the second composite material 12 by the film adhesive 21, it is not necessary to preform the corner fillet part 13. For this reason, since it is not necessary to handle the preformed corner fillet part 13, occurrence of damage of the corner fillet part 13 and the periphery of the corner fillet part 13 can be suppressed.

Additionally, according to Embodiment 1, the shape of the corner fillet part 13 can be formed in the design shape P by the bagging film 25. For this reason, the corner fillet part 13 with a large curvature radius R can be formed, for example, by arranging the bagging film 25 having a large diameter with respect to the corner part 15. On the other hand, the corner fillet part 13 with a small curvature radius R can be formed by arranging the bagging film 25 having a small diameter with respect to the corner part 15.

Additionally, according to Embodiment 1, the filling rate of the corner fillet part 13 with respect to the design shape P can be between 50% to 200%. For this reason, even in a case where the film adhesive 21 is softened and flows inside the bagging film 25 during the curing of the film adhesive 21, the film adhesive 21 can be suitably filled according to flow of the film adhesive 21. Accordingly, the corner fillet part 13 formed after curing can be precisely formed in the design shape P.

Additionally, according to Embodiment 1, since the film adhesive 21 is not easily spread by winding the film adhesive 21 spirally, the shape of the film adhesive 21 formed in a lump can be maintained easily.

In addition, other materials may be made to be present in a mixed manner in the film adhesive 21 that forms the corner fillet part 13, for example, rigid materials capable of improving rigidity other than carbon-based materials, such as carbon fibers or carbon nanotubes, may be made to be present in a mixed manner.

Additionally, in Embodiment 1, in the section cut by the surface orthogonal to the depth direction of the second composite material 12, the corner fillet part 13 is formed. However, the corner fillet part 13 may be formed on the corner part 15 formed at an end part of the second composite material 12 in the depth direction.

Figure 4:
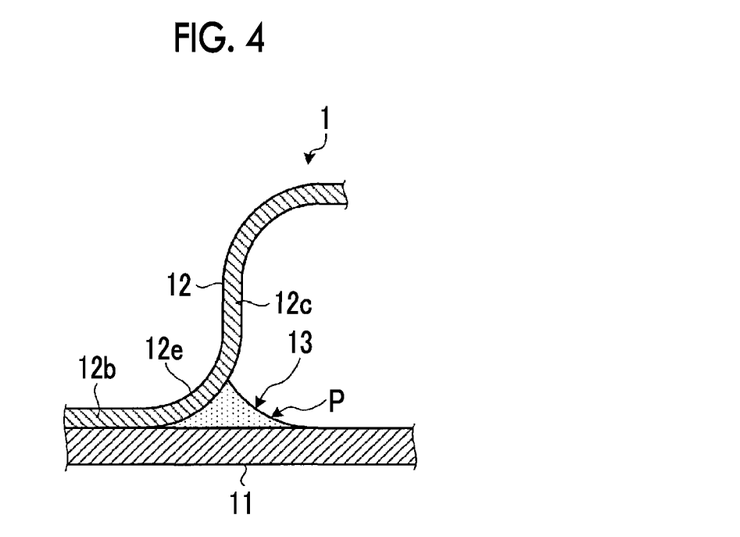
FIG. 4 is a sectional view of the composite structure after curing related to Modification Example 1.

Additionally, in Embodiment 1, the design shape P of the corner fillet part 13 is formed in the shape illustrated in FIG. 1. However, the design shape may be shapes illustrated in FIGS. 4 to 7. FIG. 4 is a sectional view of the composite structure after curing related to Modification Example 1. In the design shape P of the corner fillet part 13 illustrated in FIG. 4, the height h from each first composite material 11 is formed to be low as compared to FIG. 1, and the curvature radius R of a surface touching the outside of the corner fillet part 13 is formed with a large diameter as compared to FIG. 1.

Figure 5:
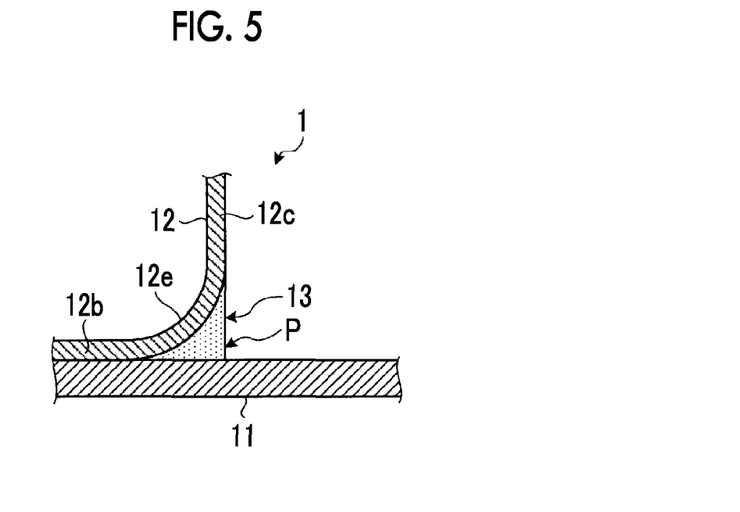
FIG. 5 is a sectional view of the composite structure after curing related to Modification Example 2.

FIG. 5 is a sectional view of the composite structure after curing related to Modification Example 2. In the design shape P of the corner fillet part 13 illustrated in FIG. 5, the surface touching the outside of the corner fillet part 13 is formed in a surface along the plate surface of longitudinal part 12c, and is formed so as to become a surface orthogonal to the plate surface of the first composite material 11.

Figure 6:
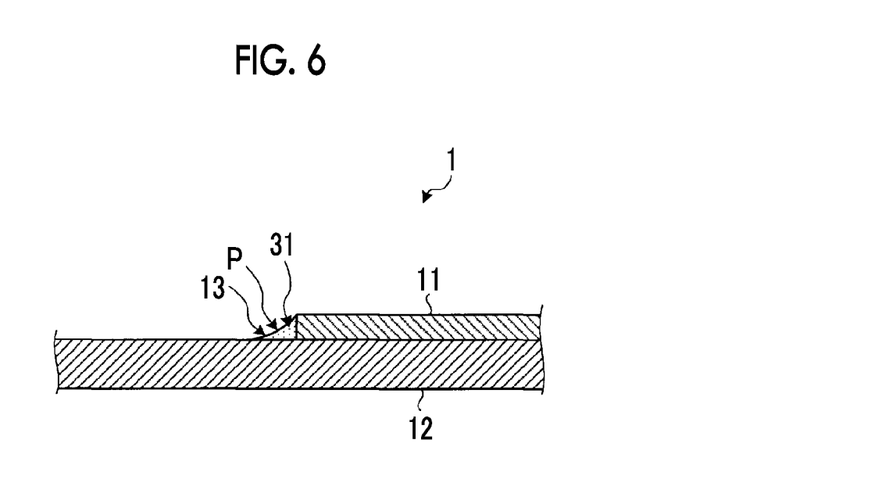
FIG. 6 is a sectional view of the composite structure after curing related to Modification Example 3.

FIG. 6 is a sectional view of the composite structure after curing related to Modification Example 3. The composite structure 1 of Modification Example 3 is that the first composite material 11 and the second composite material 12 are formed as flat plates, and the corner part 31 is formed by the first composite material 11 and the second composite material 12 by the first composite material 11 and the second composite material 12 overlapping each other. That is, the corner part 31 is formed by an end surface of the first composite material 11 and the plate surface of the second composite material 12 perpendicularly intersecting each other. The design shape P of the corner fillet part 13 formed in this corner part 31 is formed in a substantially triangular shape touching the end surface of the first composite material 11 and the plate surface of the second composite material 12, and the surface touching the outside is formed as a curved surface having a predetermined curvature radius.

Figure 7:
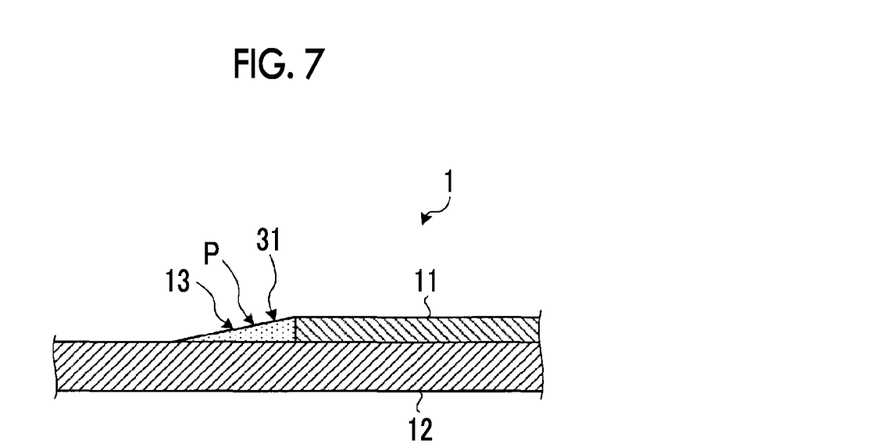
FIG. 7 is a sectional view of the composite structure after curing related to Modification Example 4.

FIG. 7 is a sectional view of the composite structure after curing related to Modification Example 4. The composite structure 1 of Modification Example 4 has the same corner part 31 as Modification Example 3. The design shape P of the corner fillet part 13 formed in this corner part 31 is formed in a triangular shape touching the end surface of the first composite material 11 and the plate surface of the second composite material 12, and the surface touching the outside is formed as a planar surface.

Embodiment 2

Figure 8:
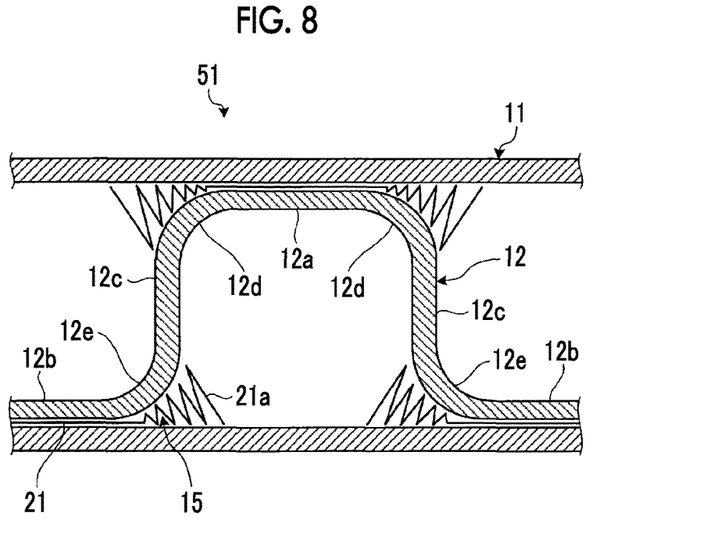
FIG. 8 is a sectional view of a composite structure before curing related to Embodiment 2.

Next, a composite structure 51 related to Embodiment 2 will be described with reference to FIG. 8. FIG. 8 is a sectional view of the composite structure before curing related to Embodiment 2. In addition, only portions different from those of Embodiment 1 will be described in order to avoid the description that overlaps Embodiment 1, and the same portions as those of Embodiment 1 will be designated by the same reference signs and will be described. In Embodiment 1, the surplus part 21a of the film adhesive 21 is wound spirally and formed in a lump. However, in Embodiment 2, the surplus part 21a of the film adhesive 21 is folded like bellows and is formed in a lump.

As illustrated in FIG. 8, the surplus part 21a of the film adhesive 21 is formed in the shape of bellows by peak folding and valley folding being alternately performed toward the outside from between each first composite material 11 and the second composite material 12. In this case, the folding width of the surplus part 21a formed in the shape of bellows is formed so as to become larger from between the first composite material 11 and the second composite material 12 toward the outside.

As described above, according to Embodiment 2, the surplus part 21a of the film adhesive 21 can be simply formed in a lump by bending the surplus part 21a of the film adhesive 21 in the shape of bellows. Additionally, a shape suitable for the design shape P of the corner fillet part 13 to be formed can be adopted by appropriately adjusting the folding width according to the shape of the corner part 15.

In addition, in Embodiment 2, the folding width of the surplus part 21a is formed so as to become larger from between the first composite material 11 and the second composite material 12 toward the outside. However, the folding width may be an equal width, and is not particularly limited to this configuration.

Embodiment 3

Figure 9:
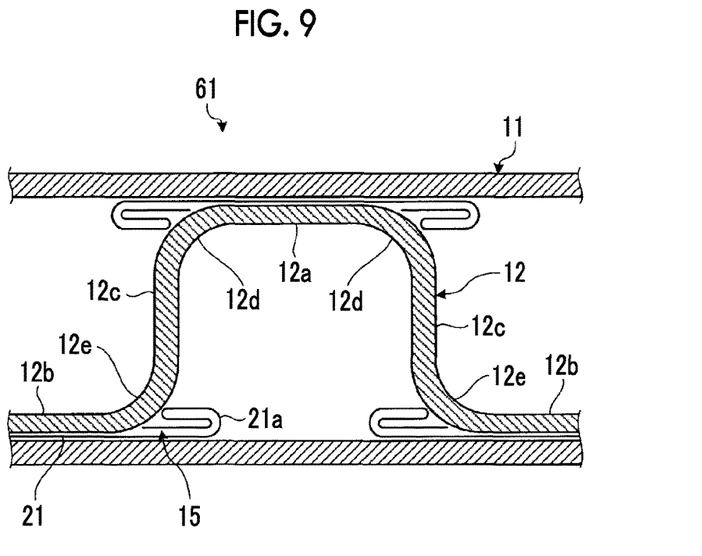
FIG. 9 is a sectional view of a composite structure before curing related to Embodiment 3.

Next, a composite structure 61 related to Embodiment 3 will be described with reference to FIG. 9. FIG. 9 is a sectional view of the composite structure before curing related to Embodiment 3. In addition, only portions different from those of Embodiments 1 and 2 will be described in order to avoid the description that overlaps Embodiments 1 and 2, and the same portions as those of Embodiments 1 and 2 will be designated by the same reference signs and will be described. In Embodiment 1, the surplus part 21a of the film adhesive 21 is wound spirally and formed in a lump. However, in Embodiment 3, the surplus part 21a of the film adhesive 21 is folded and is formed in a lump.

As illustrated in FIG. 9, the surplus part 21a of the film adhesive 21 is formed in a lump by being folded, for example, double folded. Specifically, the surplus part 21a of the film adhesive 21 is double folded by being folded in half and further folded in half. In addition, in Embodiment 3, the double folding is exemplified as the folding. However, the folding is not particularly limited to this folding method, and may be double folded twice.

As described above, according to Embodiment 3, the surplus part 21a of the film adhesive 21 can be simply formed in a lump by folding the surplus part 21a of the film adhesive 21.

Embodiment 4

Figure 10:
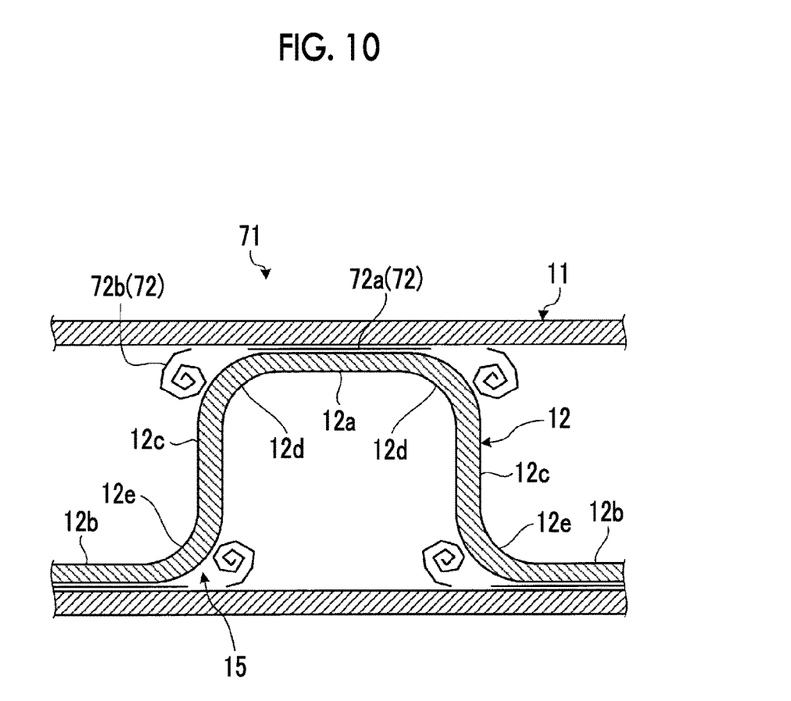
FIG. 10 is a sectional view of a composite structure before curing related to Embodiment 4.

Next, a composite structure 71 related to Embodiment 4 will be described with reference to FIG. 10. FIG. 10 is a sectional view of the composite structure before curing related to Embodiment 4. In addition, only portions different from those of Embodiments 1 to 3 will be described in order to avoid the description that overlaps Embodiments 1 to 3, and the same portions as those of Embodiments 1 to 3 will be designated by the same reference signs and will be described. In Embodiment 1, the film adhesive 21 between each first composite material 11 and the second composite material 12, and the film adhesive 21 (surplus part 21a) arranged on the corner part 15 are integrated. However, in Embodiment 4, these film adhesives are provided separately.

As illustrated in FIG. 10, the film adhesive 72 is configured to include a first film adhesive 72a arranged between the first composite material 11 and the second composite material 12, and a second film adhesive 72b that is provided separately from the first film adhesive 72a and forms the corner fillet part 13.

The first film adhesive 72a is arranged between the first composite material 11 and the second composite material 12 without being exposed from between the first composite material 11 and the second composite material 12. That is, the first film adhesive 72a is arranged at a site where the abutment parts 12a and 12b of the first composite material 11 and the second composite material 12 come into contact with each other. The second film adhesive 72b is formed in a lump by being wound spirally, similar to the surplus part 21a of the film adhesive 21 of Embodiment 1. Then, the second film adhesive 72b formed in a lump is arranged on the corner part 15.

Here, since the second film adhesive 72b is provided separately from the first film adhesive 72a, the shape, type, or the like of the second film adhesive 72b can be changed according to the corner part 15. For example, although the corner part 15 is formed to extend in the depth direction, the shape of the second film adhesive 72b can be changed in the depth direction in order to change the rigidity of the corner fillet part 13.

As described above, according to Embodiment 4, since the film adhesive 72 can be provided separately as the first film adhesive 72a and the second film adhesive 72b, the corner fillet part 13 according to the corner part 15 can be formed by changing the shape, type, or the like of the second film adhesive 72b.

REFERENCE SIGNS LIST

1: COMPOSITE STRUCTURE
11: FIRST COMPOSITE MATERIAL
12: SECOND COMPOSITE MATERIAL
13: CORNER FILLET PART
15: CORNER PART
17: ADHESIVE LAYER
21: FILM ADHESIVE
21a: SURPLUS PART
25: BAGGING FILM
31: CORNER PART (MODIFICATION EXAMPLES 3 AND 4)
51: COMPOSITE STRUCTURE (EMBODIMENT 2)
61: COMPOSITE STRUCTURE (EMBODIMENT 3)
71: COMPOSITE STRUCTURE (EMBODIMENT 4)
72: FILM ADHESIVE (EMBODIMENT 4)
72a: FIRST FILM ADHESIVE
72b: SECOND FILM ADHESIVE
P: DESIGN SHAPE
S: CROSS-SECTIONAL AREA OF DESIGN SHAPE
L: BASE OF DESIGN SHAPE
h: HEIGHT OF DESIGN SHAPE

The invention claimed is:

1. A method for molding a composite structure comprising:
　a film formation step of forming a film adhesive in a lump, wherein the film adhesive is intended to be used in order to join a first composite material and a second composite material together;
　an arrangement step of arranging the film adhesive formed in a lump on a corner part formed by the first composite material and the second composite material; and
　a curing step of curing the film adhesive to form a corner fillet part in the corner part,
　wherein the film adhesive arranged on the corner part is formed in a lump by being bent in the shape of bellows.

2. The method for molding a composite structure according to claim 1,
　wherein the film adhesive is continuous toward the corner part from between the first composite material and the second composite material, and
　wherein the corner fillet part is formed with a surplus part of the film adhesive exposed from between the first composite material and the second composite material.

3. The method for molding a composite structure according to claim 1,
　wherein the film adhesive includes
　a first film adhesive arranged between the first composite material, and the second composite material, and
　a second film adhesive provided separately from the first film adhesive to form the corner fillet part.

4. The method for molding a composite structure according to claim 1,
　wherein a bagging film is arranged on the corner part in the curing step,
　wherein the bagging film is arranged such that the shape of the corner fillet part becomes a design shape designed in advance, and
　wherein the corner fillet part is formed in the design shape by curing the film adhesive after the shape of the bagging film.

5. The method for molding a composite structure according to claim 1, wherein the size of the film adhesive that forms the corner fillet part is adjusted such that a filling rate of the film adhesive with respect to a design shape of the corner fillet part designed in advance is between 50% to 200%, and wherein the filling rate is associated with flow of the film adhesive.

* * * * *